(12) United States Patent
Hoshing et al.

(10) Patent No.: US 11,752,954 B2
(45) Date of Patent: Sep. 12, 2023

(54) VEHICLE INTERIOR TRIM SECURING SYSTEMS AND ASSOCIATED METHODS

(71) Applicant: Toyota Motor Engineering & Manufacturing North America, Inc., Plano, TX (US)

(72) Inventors: Abhijeet Anil Hoshing, Ann Arbor, MI (US); Jonathan Quijano, Ann Arbor, MI (US); James M Thomas, Jr., Ypsilanti, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 248 days.

(21) Appl. No.: 17/223,153

(22) Filed: Apr. 6, 2021

(65) Prior Publication Data
US 2022/0314900 A1 Oct. 6, 2022

(51) Int. Cl.
*B60R 13/02* (2006.01)
*B60R 13/04* (2006.01)
(Continued)

(52) U.S. Cl.
CPC ............ *B60R 13/02* (2013.01); *B60J 10/85* (2016.02); *B60R 16/0215* (2013.01);
(Continued)

(58) Field of Classification Search
CPC ....... B60R 13/02; B60R 13/04; B60R 13/043; B60R 13/0206; B60R 13/0237;
(Continued)

(56) References Cited

U.S. PATENT DOCUMENTS 4,846,429 A * 7/1989 Scheurer ............... F16B 47/00
248/205.8
6,076,002 A 6/2000 Cartmell et al.
(Continued)

FOREIGN PATENT DOCUMENTS

CN 201218268 Y 4/2009
CN 201881997 U * 6/2011 ............. B60R 13/02
(Continued)

OTHER PUBLICATIONS

Li et al. "Mounting fixtures for vehicle interior parts and electrical wiring harness parts", Published: Jun. 29, 2011, Publisher: Chinese Patent Office, Edition: CN201881997U (Year: 2011).*
(Continued)

*Primary Examiner* — Dennis H Pedder
*Assistant Examiner* — Joyce Eileen Hill
(74) *Attorney, Agent, or Firm* — Dinsmore & Shohl LLP

(57) ABSTRACT

A vehicle interior trim securing system includes a trim piece that includes a trim piece body. The trim piece includes a wire harness support that extends outward from the trim piece body that includes a support portion including an inner portion, an outer portion and a connecting portion that connects the inner portion and the outer portion forming a channel that is sized to receive a wire harness. A sealing structure includes a suction cup that is connected to the outer portion and a pull tab connected to the suction cup. The pull tab is partially covered by the trim piece body with the suction cup adhered to a floor underbody panel and has a length such that a free end extends laterally beyond the trim piece body.

15 Claims, 3 Drawing Sheets

(51) Int. Cl.
*B60R 16/02* (2006.01)
*B60J 10/84* (2016.01)
*B62D 25/20* (2006.01)
*F16B 47/00* (2006.01)

(52) U.S. Cl.
CPC .......... *B62D 25/20* (2013.01); *B60R 13/0206* (2013.01); *B60R 13/04* (2013.01); *B60R 2013/0287* (2013.01); *F16B 47/00* (2013.01)

(58) Field of Classification Search
CPC .............. B60R 13/025; B60R 16/0215; B60R 2013/0287; B60R 11/00; B60R 2011/0003; B60R 2011/0029; B60R 2011/0042; B60R 2011/0056; B60R 2011/0068; B60J 10/85; B62D 25/20; B62D 25/2009; B62D 25/2036; B60H 1/246; F16B 47/00; H02G 3/0437; H02G 3/26; H02G 3/32
USPC ..... 296/1.08, 39.1; 248/206.2, 206.3, 206.4; 174/72 A
See application file for complete search history.

(56) References Cited

U.S. PATENT DOCUMENTS

| | | | |
|---|---|---|---|
| 7,705,720 B2 | 4/2010 | Jachmann | |
| 8,894,125 B2 * | 11/2014 | Johannboeke | B60H 1/00271 |
| | | | 296/70 |
| 9,917,454 B2 * | 3/2018 | Parlow | B60R 7/06 |
| 2010/0304070 A1 | 12/2010 | Meles | |
| 2013/0328354 A1* | 12/2013 | Bauer | B60R 16/0215 |
| | | | 296/199 |
| 2021/0197739 A1* | 7/2021 | Okaniwa | H02G 3/32 |

FOREIGN PATENT DOCUMENTS

| | | | | |
|---|---|---|---|---|
| CN | 202071665 U | | 12/2011 | |
| CN | 202806631 U | * | 3/2013 | ............. B60R 16/02 |
| CN | 103775742 A | * | 5/2014 | ................ F16B 2/00 |
| CN | 105667423 A | * | 6/2016 | ......... B60R 15/0215 |
| CN | 209395722 U | | 9/2019 | |
| CN | 211802794 U | | 10/2020 | |
| EP | 3492321 A1 | | 6/2019 | |
| ES | 2388523 B1 | | 9/2013 | |
| TW | M420607 U | | 1/2012 | |

OTHER PUBLICATIONS

Gao et al., "Wire Harness Clip", Published: Jun. 15, 2016, Publisher: Chinese Patent Office, Edition: CN105667423A (Year: 2016).*
Chen et al., "Vehicle Wiring Harness Fixing Device", Published: Mar. 20, 2013, Publisher: Chinese Patent Office, Edition: CN202806631U (Year: 2013).*
Chang, "Multipurpose Plastic Clip", Published: May 7, 2014, Publisher: Chinese Patent Office, Edition: CN103775742A (Year: 2014).*

* cited by examiner

VEHICLE INTERIOR TRIM SECURING SYSTEMS AND ASSOCIATED METHODS

TECHNICAL FIELD

The present specification generally relates to vehicle interior trim securing systems and, more specifically, to interior trim securing systems and methods for vehicles.

BACKGROUND

Vehicles include various side trims around door frames including pillars. In some locations, the side trims may hide structures, such as wire harness assemblies that extend lengthwise through the vehicles and outer edges of carpets that cover underbody panels of the vehicles, as examples. To anchor the side trims, they may be interlocked with the wire harness assemblies that are, in turn, anchored to the underbody panels through clipping holes in the underbody panels. This current anchoring process can be time-consuming and provides holes through the underbody panels, which can reduce durability of the underbody panels.

Accordingly, a need exists for alternative vehicle trim securing systems and associated methods.

SUMMARY

In one embodiment, a vehicle interior trim securing system includes a trim piece that includes a trim piece body. The trim piece includes a wire harness support that extends outward from the trim piece body that includes a support portion including an inner portion, an outer portion and a connecting portion that connects the inner portion and the outer portion forming a channel that is sized to receive a wire harness. A sealing structure includes a suction cup that is connected to the outer portion and a pull tab connected to the suction cup. The pull tab is partially covered by the trim piece body with the suction cup adhered to a vehicle panel and has a length such that a free end extends laterally beyond the trim piece body.

In another embodiment, a method of connecting a trim piece of a vehicle to a floor underbody panel of the vehicle using a vehicle interior trim securing system is provided. The method includes positioning the trim piece on a floor underbody panel. The trim piece includes a trim piece body and a wire harness support that extends outward from the trim piece body that includes a support portion including an inner portion, an outer portion and a connecting portion that connects the inner portion and the outer portion that forms a channel that is sized to receive a wire harness. A sealing structure includes a suction cup connected to the outer portion and a pull tab connected to the suction cup. A free end of the pull tab is placed laterally outside the trim piece body. The trim piece is adhered to the floor underbody panel using the suction cup.

In another embodiment, a vehicle includes a floor underbody panel and a trim piece adhered to the floor underbody panel. The trim piece includes a trim piece body; and a wire harness support that extends outward from the trim piece body that includes a support portion including an inner portion, an outer portion and a connecting portion that connects the inner portion and the outer portion that forms a channel receiving a wire harness. A sealing structure includes a suction cup connected to the outer portion and a pull tab connected to the suction cup. The pull tab is partially covered by the trim piece body with the suction cup adhered to the floor underbody panel and has a length such that a free end extends laterally beyond the trim piece body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a vehicle interior trim securing system that includes a trim piece that includes a trim piece body and a wire harness support that extends outward from the trim piece body that includes a U-shaped support portion that is sized and configured to receive a wire harness therein. The wire harness support includes an inner portion that is nearer to the trim piece body, an outer portion that is nearer to a floor underbody panel and a connecting portion that connects the inner portion and the outer portion. A sealing structure extends outward from the outer portion of the wire harness support that includes a suction cup that seals against a floor underbody panel thereby connecting the wire harness support and therefore the trim piece body to the floor underbody panel. To assist in disconnecting the suction cup from the floor underbody panel, a pull tab may be provided that extends outward from the suction cup. The pull tab is of a length that is accessible from outside the trim piece body such that an end portion of the pull tab can be pulled to allow air to enter between the suction cup and the floor underbody panel thereby releasing the suction cup from the floor underbody panel.

Figure 1:
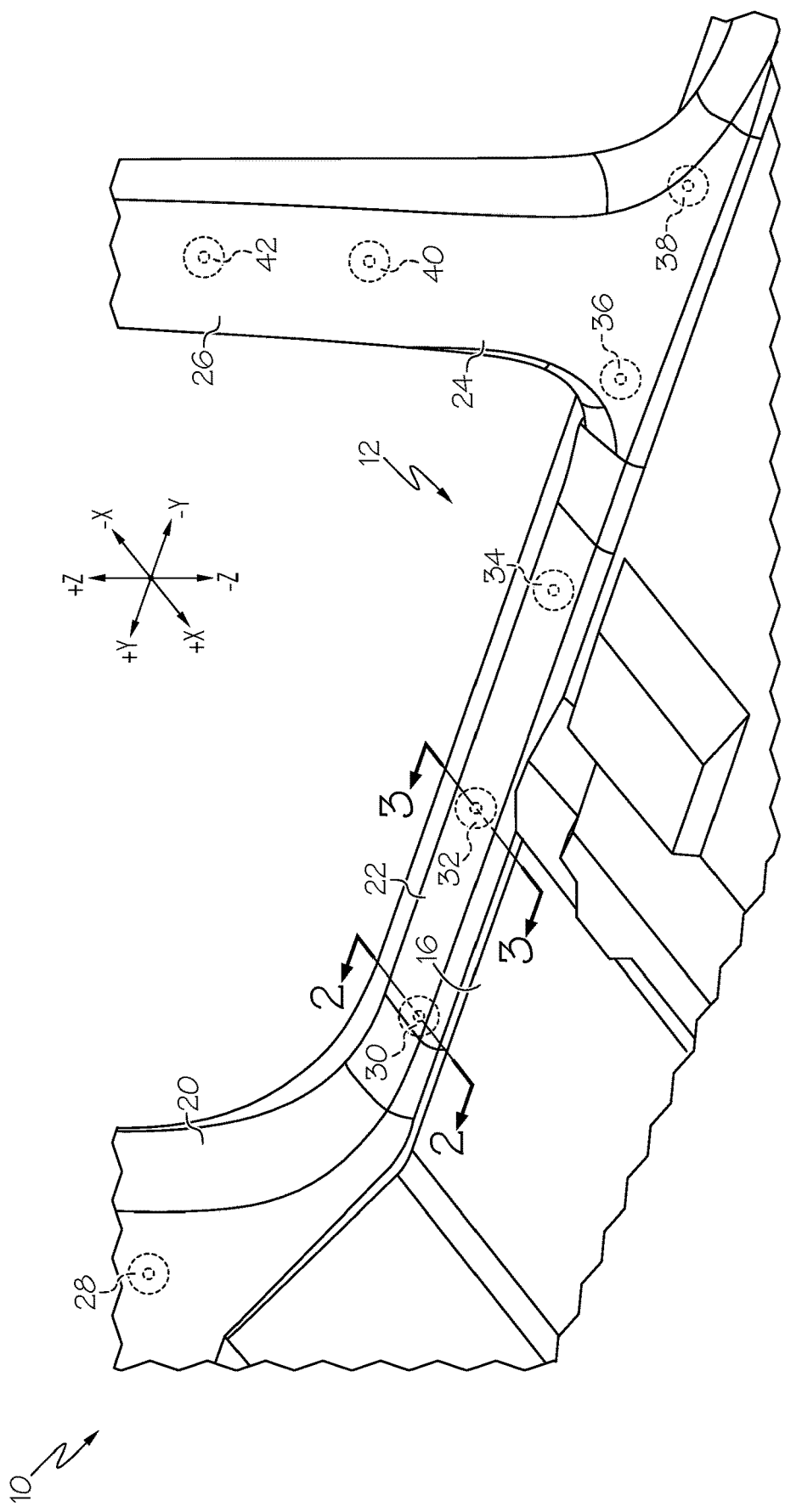
FIG. 1 depicts a portion of a floor assembly of a vehicle including a vehicle interior trim securing system, according to one or more embodiments shown and described herein.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in the direction away from a vehicle centerline. The term "inboard" or "inward" as used herein refers to the relative location of a component in the direction opposite of "outboard" or "outward." Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle (represented by element 10).

Referring to FIG. 1, a partial perspective view of a vehicle floor assembly 12 that is part of a passenger compartment of the vehicle 10 is shown. The vehicle floor assembly 12 includes a floor underbody comprising floor underbody panels 16, which may be formed of a metal, such as steel. A carpet may be used to cover the floor underbody 16. The vehicle floor assembly 12 further includes a number of floor trim pieces 20, 22, 24 and 26. Trim piece 20 may be, for example, a cowl side trim piece, trim piece 22 may be a front scuff plate trim piece, trim piece 24 may be a lower pillar trim piece and trim piece 26 may be an upper pillar trim piece. As used herein, the terms "floor trim piece" and "trim piece" refer to any covering, typically a molded plastic, that is used to cover a portion of a vehicle panel, such as the under/upper body metal panels. Generally, the underbody includes the floor, engine compartment and frame of the vehicle and the upper body is everything that rests on the underbody.

Located under the trim pieces 20, 22, 24 and 26 are sealing structures 28, 30, 32, 34, 36, 38, 40 and 42. As described in greater detail below, the sealing structures 28, 30, 32, 34, 36, 38, 40 and 42 each include a suction cup that is used to provide an attachment between the trim pieces 20, 22, 24 and 26 and the floor underbody panels 16.

Figure 2:
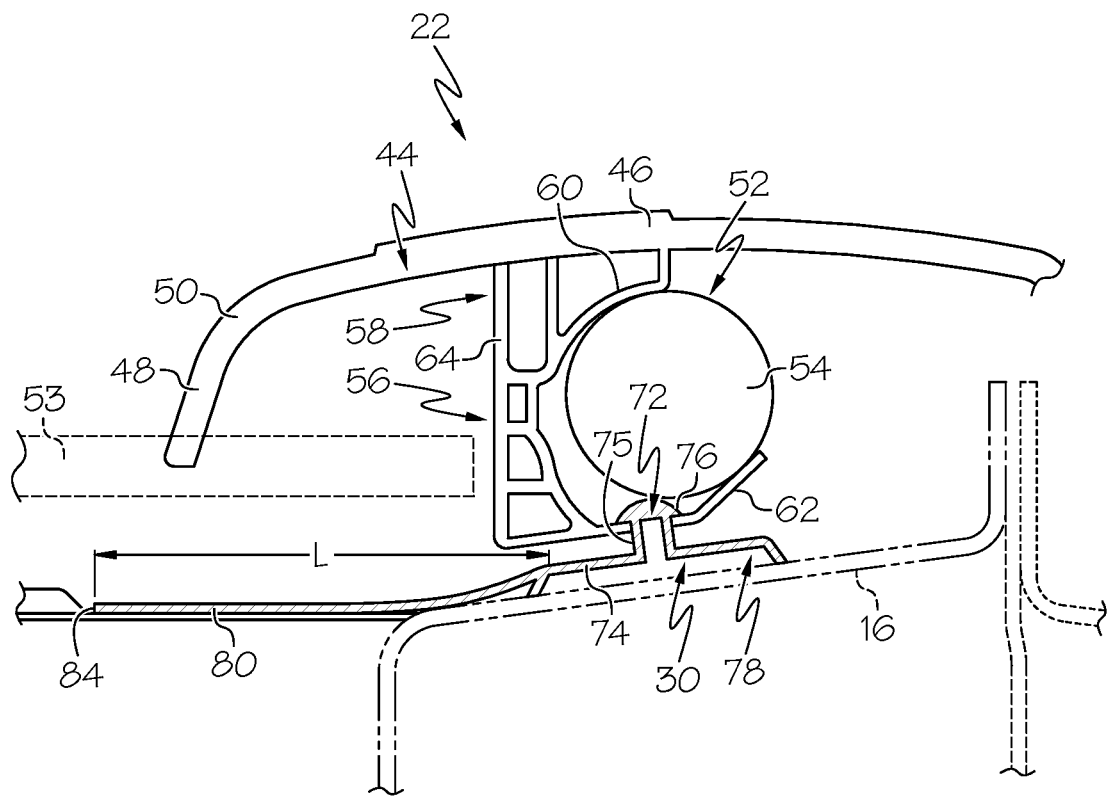
FIG. 2 depicts a section view of the vehicle interior trim securing system along line 2-2 of FIG. 1, according to one or more embodiments shown and described herein.

Referring to FIG. 2, the trim piece 22 may provide a front scuff plate at a side of the vehicle 10 and includes a trim piece body 44 including a lateral portion 46 that extends laterally in a widthwise direction and longitudinally in a lengthwise direction and a vertical portion 48 that extends generally vertically and also longitudinally in the lengthwise direction. While trim piece 22 is described in detail, any of the trim pieces 20, 24, 26 may include the same or similar components. The lateral portion 46 and the vertical portion 48 may meet at a corner 50, which is a transition between the lateral and vertical portions 46 and 48. The corner 50 may have any radius of curvature that transitions between surfaces that extend at different angles and may depend on the location and styling of a particular vehicle. For example, a cowl side trim piece may have a different shape and dimensions than the front scuff plate trim piece.

In some embodiments, a wire harness assembly 52 may be located underneath and hidden from view by the trim piece body 44. In some embodiments, the vertical portion 48 of the trim piece body 44 may touch off to a carpet 53 to reduce a gap therebetween and hide the wire harness assembly 52 from view. The wire harness assembly 52 may include a wire harness 54 that is received within a support portion 56 of a wire harness support 58. The wire harness support 58 extends outward from the lateral portion 46 of the trim piece body 44 and may be formed monolithically therewith. The support portion 56 includes an inner portion 60 that is nearer the lateral portion 46, an outer portion 62 that is nearer the floor underbody panel 16 and a connecting portion 64 that connects the inner and outer portions 60 and 62 forming a somewhat U-shaped channel 66 that is sized and configured to receive a portion of the wire harness 54. As can be seen, the wire harness support 58 supports the wire harness 54 spaced from the floor underbody panel 16.

The sealing structure 30 extends outward from the outer portion 62 of the support portion 56. The sealing structure 30 includes a connector 72 having a stem portion 75 and an enlarged head portion 76 that provides a snap-fit connection with the outer portion 62 of the support portion 56 and a suction cup 74 that is connected to the stem portion 75 opposite the enlarged head portion 76. The suction cup 74 is sized and shaped to seal against the floor underbody panel 16 thereby connecting the wire harness support 58 and therefore the trim piece body 44 to the floor underbody panel 16. As used herein, the term "suction cup" refers to a structure that uses negative pressure of fluid (e.g., air) to adhere to a non-porous surface. The suction cup 74 is sealed against the floor underbody panel 16 when air is squeezed out of the suction cup 74 and a low pressure region is created inside a suction area 78 between the suction cup 74 and the floor underbody panel 16.

A pull tab 80 has an end 82 that is connected to the suction cup 74. The pull tab 80 extends outward from the suction cup 74 to a free end 84. As can be seen, the pull tab 80 may be of a length L that is sized to allow the free end 84 to extend laterally beyond the vertical portion 48 and be exposed outside the trim piece body 44. The pull tab 80 is of the length L that is accessible from outside the trim piece body 44 such that the free end 84 can be grasped and pulled (e.g., with the carpet 53 removed) to allow air to enter between the suction cup 74 and the floor underbody panel 16 thereby releasing the suction cup 74 from the floor underbody panel 16. As one example, the pull tab 80 may have a width of at least about 10 mm and a thickness of at least about two mm to facilitate grasping of the free end 84. The pull tab 80 may be formed as a monolithic part of the suction cup 74 out of the same material or the pull tab 80 may be formed separately from the suction cup 74 and then connected thereto. Either way, the pull tab 80 is considered connected to the suction cup 74 and may be considered flexible in that the pull tab 80 can bend easily under a manual force.

Figure 3:
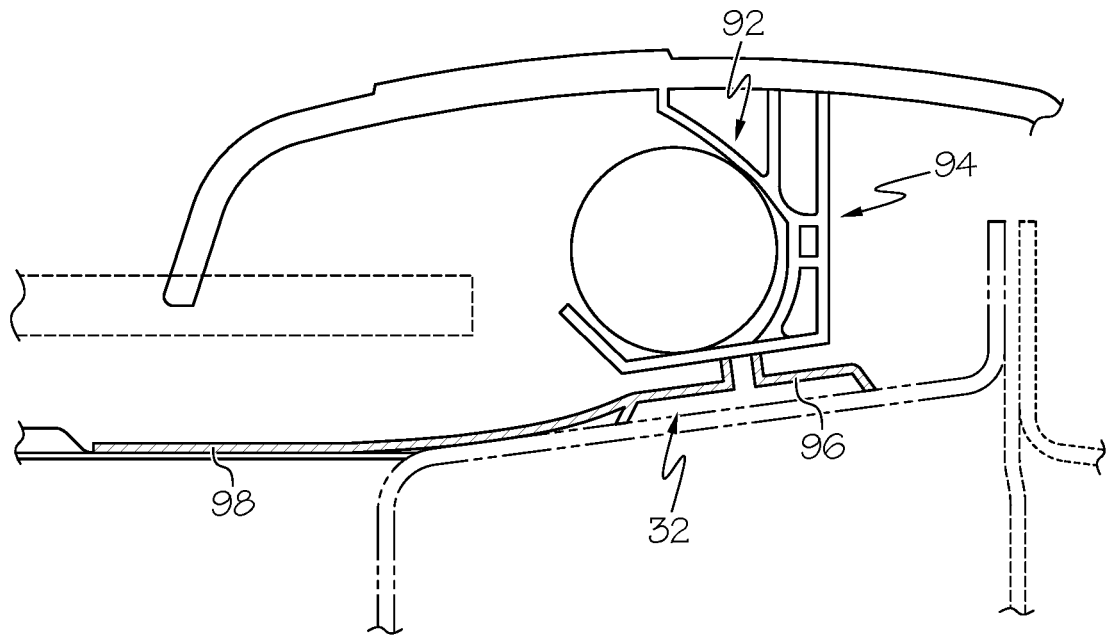
FIG. 3 depicts another section view of the vehicle carpet securing system along line 3-3 of FIG. 1, according to one or more embodiments shown and described herein.
Figure 4:
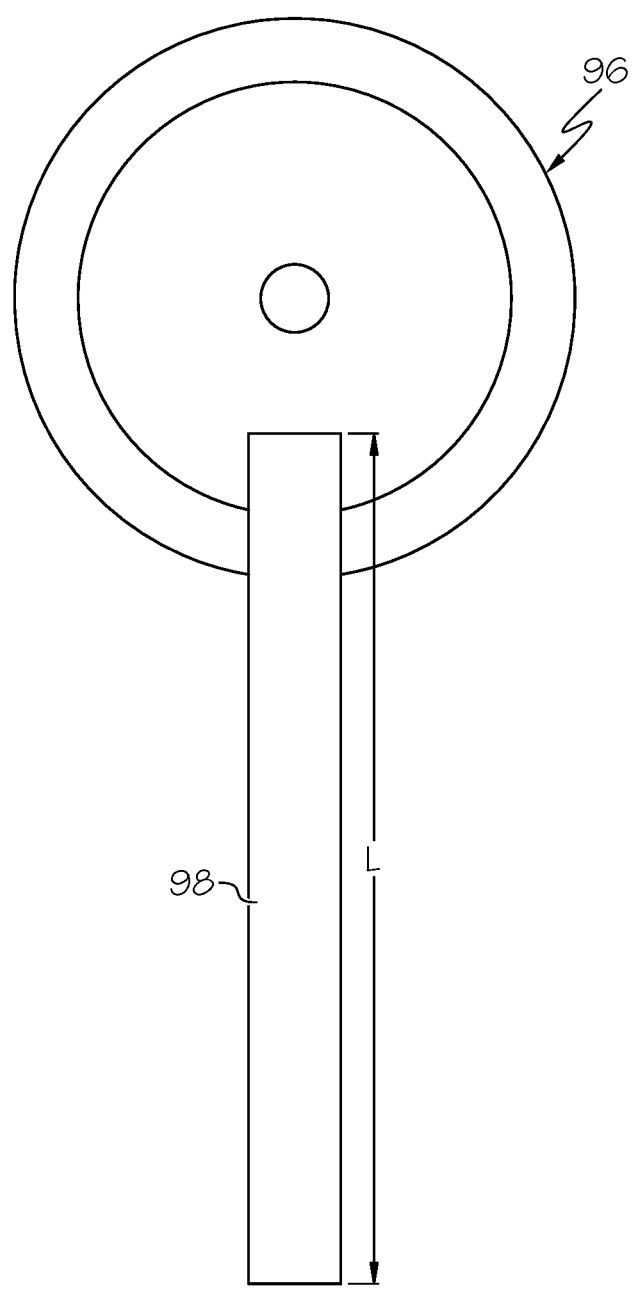
FIG. 4 illustrates diagrammatically a suction cup and pull tab for use with the vehicle carpet securing system of FIG. 3.

FIG. 2 illustrates an embodiment of the wire harness support 58 where the sealing structure 30 is connected to the support portion 56 by the connector 72 having the enlarged head portion 76 providing a mechanical connection. Referring to FIG. 3, in another embodiment, the sealing structure 32 is connected to a support portion 92 of a wire harness support 94 by integrally forming the sealing structure 90 and the wire harness support 94 together as a same monolithic piece (e.g., by molding). Further, a suction cup 96 and a pull tab 98 may also be formed monolithically with the support portion 92. FIG. 4 illustrates a top view of the suction cup 96 and pull tab 98 in isolation.

The above-described vehicle interior trim securing systems include trim pieces that utilize suction cups in order to secure the trim pieces to floor underbody panels. Multiple suction cups may be used for each trim panel and over multiple trim panels, as shown by FIG. 1. The suction cups can provide a releasable suction attachment to the floor underbody panels and/or upper body panels that provide a straight-forward attachment without any need for drilling or otherwise providing clipping holes through the panels, which can provide locations for water egress and corrosion of the floor underbody panels. Further, flexible pull tabs can be provided that are connected to the suction cups and are of a length such that their free ends are exposed outside the trim pieces. The pull tabs have a length such that free ends of the pull tabs are exposed outside of the trim panels. Further, if located on the floor, the pull tabs can be hidden underneath the carpet, between the carpet and the floor panels. The pull tabs can be manually grasped and pulled to readily release the suction cups from the floor underbody and remove the trim panels.

It is noted that the terms "substantially" and/or "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle interior trim securing system comprising:
   a trim piece that includes a trim piece body, the trim piece comprising:
      a wire harness support that extends outward from the trim piece body that includes a support portion including an inner portion, an outer portion and a connecting portion that connects the inner portion and the outer portion that forms a channel that is sized to receive a wire harness; and
      a sealing structure comprising a suction cup connected to the outer portion and a pull tab connected to the suction cup, the pull tab partially covered by the trim piece body with the suction cup adhered to a vehicle panel and having a length such that a free end extends laterally beyond the trim piece body,
   wherein the trim piece body has a lateral portion and a vertical portion that is connected to the lateral portion at a corner such that the suction cup is spaced from the vertical portion under the lateral portion, wherein the pull tab has the length configured to extend laterally under the lateral portion and beyond the vertical portion with the suction cup adhered to the vehicle panel.

2. The vehicle interior trim securing system of claim 1, wherein the wire harness support is formed monolithically with the lateral portion of the trim piece body.

3. The vehicle interior securing system of claim 1, wherein the sealing structure is formed monolithically with the outer portion.

4. The vehicle interior securing system of claim 1, wherein the sealing structure comprises a connector that mechanically connects the sealing structure to the outer portion.

5. The vehicle interior securing system of claim 4, wherein the connector comprises a stem portion and an enlarged head portion that connects to the outer portion.

6. A method of connecting a trim piece of a vehicle to a floor underbody panel of the vehicle using a vehicle interior trim securing system, the method comprising:
   positioning the trim piece on a floor underbody panel, the trim piece comprising:
      a trim piece body;
      a wire harness support that extends outward from the trim piece body that includes a support portion including an inner portion, an outer portion and a connecting portion that connects the inner portion and the outer portion that forms a channel that is sized to receive a wire harness; and
      a sealing structure comprising a suction cup connected to the outer portion and a pull tab connected to the suction cup;
      wherein the trim piece body has a lateral portion and a vertical portion that is connected to the lateral portion at a corner such that the suction cup is spaced from the vertical portion under the lateral portion, wherein the pull tab has the length configured to extend laterally under the lateral portion and beyond the vertical portion with the suction cup adhered to the vehicle panel;
   placing a free end of the pull tab laterally outside the vertical portion of the trim piece body; and
   adhering the trim piece to the floor underbody panel using the suction cup.

7. The method of claim 6, wherein, after the step of adhering the trim piece to the floor underbody panel, releasing the suction cup from the floor underbody panel by pulling the pull tab.

8. The method of claim 6, wherein, before the step of adhering the trim piece to the floor underbody panel, placing a wire harness within the channel.

9. The method of claim 6, wherein the wire harness support is formed monolithically with the trim piece body.

10. The method of claim 6, wherein the sealing structure is formed monolithically with the outer portion.

11. A vehicle comprising:
    a floor underbody panel; and
    a trim piece adhered to the floor underbody panel, the trim piece comprising:
       a trim piece body;
       a wire harness support that extends outward from the trim piece body that includes a support portion including an inner portion, an outer portion and a connecting portion that connects the inner portion and the outer portion that forms a channel receiving a wire harness; and
       a sealing structure comprising a suction cup connected to the outer portion and a pull tab connected to the suction cup, the pull tab partially covered by the trim piece body with the suction cup adhered to the floor underbody panel and having a length such that a free end extends laterally beyond the trim piece body;
    wherein the trim piece body has a lateral portion and a vertical portion that is connected to the lateral portion at a corner such that the suction cup is spaced from the vertical portion under the lateral portion, wherein the pull tab has the length configured to extend laterally under the lateral portion and beyond the vertical portion with the suction cup adhered to the floor underbody panel.

12. The vehicle of claim 11, wherein the wire harness support is formed monolithically with the lateral portion of the trim piece body.

13. The vehicle of claim 11, wherein the sealing structure is formed monolithically with the outer portion.

14. The vehicle of claim 11, wherein the sealing structure comprises a connector that mechanically connects the sealing structure to the outer portion.

15. The vehicle of claim 14, wherein the connector comprises a stem portion and an enlarged head portion that connects to the outer portion.

* * * * *